US012646982B2

(12) United States Patent
Hiratsuka et al.

(10) Patent No.: US 12,646,982 B2
(45) Date of Patent: Jun. 2, 2026

(54) ROTARY MACHINE UNIT, COMPRESSOR, AND REFRIGERATION DEVICE

(71) Applicant: DAIKIN INDUSTRIES, LTD., Osaka (JP)

(72) Inventors: Daisuke Hiratsuka, Osaka (JP); Hiroshi Hibino, Osaka (JP); Shoujirou Naka, Osaka (JP); Mikiya Kasai, Osaka (JP); Masatoshi Itou, Osaka (JP); Satoshi Yamamoto, Osaka (JP); Takahiro Imai, Osaka (JP)

(73) Assignee: DAIKIN INDUSRIES, LTD., Osaka (JP)

( * ) Notice: Subject to any disclaimer, the term of this patent is extended or adjusted under 35 U.S.C. 154(b) by 211 days.

(21) Appl. No.: 18/371,219

(22) Filed: Sep. 21, 2023

(65) Prior Publication Data

US 2024/0014698 A1 Jan. 11, 2024

Related U.S. Application Data

(63) Continuation of application No. PCT/JP2022/012195, filed on Mar. 17, 2022.

(30) Foreign Application Priority Data

Mar. 26, 2021 (JP) ................................. 2021-053059

(51) Int. Cl.
H02K 1/18 (2006.01)
F25B 31/02 (2006.01)
H02K 7/14 (2006.01)

(52) U.S. Cl.
CPC ............. H02K 1/18 (2013.01); F25B 31/026 (2013.01); H02K 7/14 (2013.01)

(58) Field of Classification Search
CPC ............. H02K 1/18; H02K 7/14; H02K 15/10
(Continued)

(56) References Cited

U.S. PATENT DOCUMENTS

2001/0038797 A1 11/2001 Makino et al.
2006/0012262 A1* 1/2006 Baba ...................... H02K 1/185
310/43
(Continued)

FOREIGN PATENT DOCUMENTS

DE 1037572 * 8/1958
DE 1037572 B * 8/1958
(Continued)

OTHER PUBLICATIONS

International Search Report of corresponding PCT Application No. PCT/JP2022/012195 dated May 24, 2022.
(Continued)

*Primary Examiner* — Jose A Gonzalez Quinones
(74) *Attorney, Agent, or Firm* — Spencer Fane LLP

(57) ABSTRACT

A rotary machine unit includes a casing having a tubular barrel, a stator core fixed to an inner peripheral surface of the tubular barrel, and a first member provided between the inner peripheral surface of the tubular barrel and an outer peripheral surface of the stator core. A shape of the inner peripheral surface of the tubular barrel is a non-perfect circular shape as viewed in a cylinder axis direction of the tubular barrel. The first member is made of a material having a lower Young's modulus than a material forming the tubular barrel and a material forming the stator core.

16 Claims, 10 Drawing Sheets

(58) Field of Classification Search
USPC ................................................ 310/40 R, 89
See application file for complete search history.

(56) References Cited

U.S. PATENT DOCUMENTS

| 2010/0021321 | A1 | | 1/2010 | Koike et al. | |
| 2022/0216775 | A1 | * | 7/2022 | Naka ........................ | H02K 1/24 |

FOREIGN PATENT DOCUMENTS

| JP | 2-83393 | U | | 6/1990 | | |
| JP | 2001-304123 | A | | 10/2001 | | |
| JP | 2003-176781 | A | | 6/2003 | | |
| JP | 2006-27355 | A | | 2/2006 | | |
| JP | 2008267241 | A | * | 11/2008 | | |
| JP | 2009-95184 | A | | 4/2009 | | |
| JP | 2009068468 | A | * | 4/2009 | | |
| JP | 4487382 | B2 | * | 6/2010 | ......... | F04C 29/0085 |
| JP | 2011-55576 | A | | 3/2011 | | |
| JP | 2011055576 | A | * | 3/2011 | | |
| JP | 2014-134109 | A | | 7/2014 | | |
| WO | 2015/056364 | A1 | | 4/2015 | | |
| WO | WO-2017141361 | A1 | * | 8/2017 | .............. | H02K 1/18 |

OTHER PUBLICATIONS

International Preliminary Report of corresponding PCT Application No. PCT/JP2022/004722 dated Oct. 5, 2023.
European Search Report of corresponding EP Application No. 22 77 5383.7 dated Jul. 11, 2024.

* cited by examiner d = d1 − d2

ROTARY MACHINE UNIT, COMPRESSOR, AND REFRIGERATION DEVICE

CROSS-REFERENCE TO RELATED APPLICATIONS

This is a continuation of International No. PCT/JP2022/012195 filed on Mar. 17, 2022, which claims priority to Japanese Patent Application No. 2021-053059, filed on Mar. 26, 2021. The entire disclosures of these applications are incorporated by reference herein.

BACKGROUND

Technical Field

The present disclosure relates to a rotary machine unit, a compressor, and a refrigeration apparatus.

Background Art

Japanese Unexamined Patent Publication No. 2003-176781 discloses a compressor configured such that a stator of an electric motor is disposed in a barrel of a casing by clearance fit or transition fit.

SUMMARY

A first aspect of the present disclosure is directed to a rotary machine unit including a casing having a tubular barrel, a stator core fixed to an inner peripheral surface of the tubular barrel, and a first member provided between the inner peripheral surface of the tubular barrel and an outer peripheral surface of the stator core. A shape of the inner peripheral surface of the tubular barrel is a non-perfect circular shape as viewed in a cylinder axis direction of the tubular barrel. The first member is made of a material having a lower Young's modulus than a material forming the tubular barrel and a material forming the stator core.

DETAILED DESCRIPTION OF EMBODIMENT(S)

Figure 4:
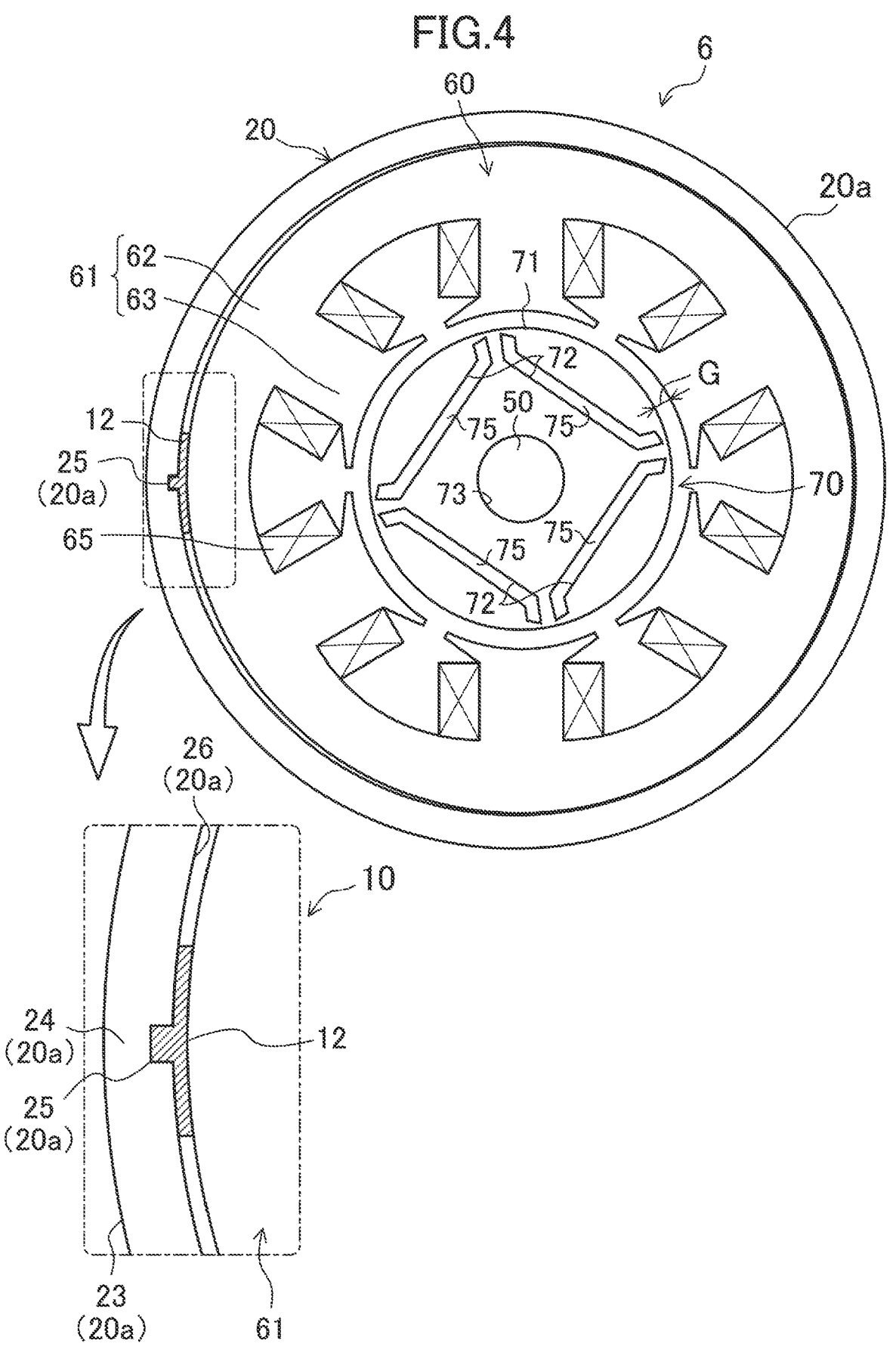
FIG. 4 is a cross-sectional view of the compressor having the rotary machine unit.
Figure 7:
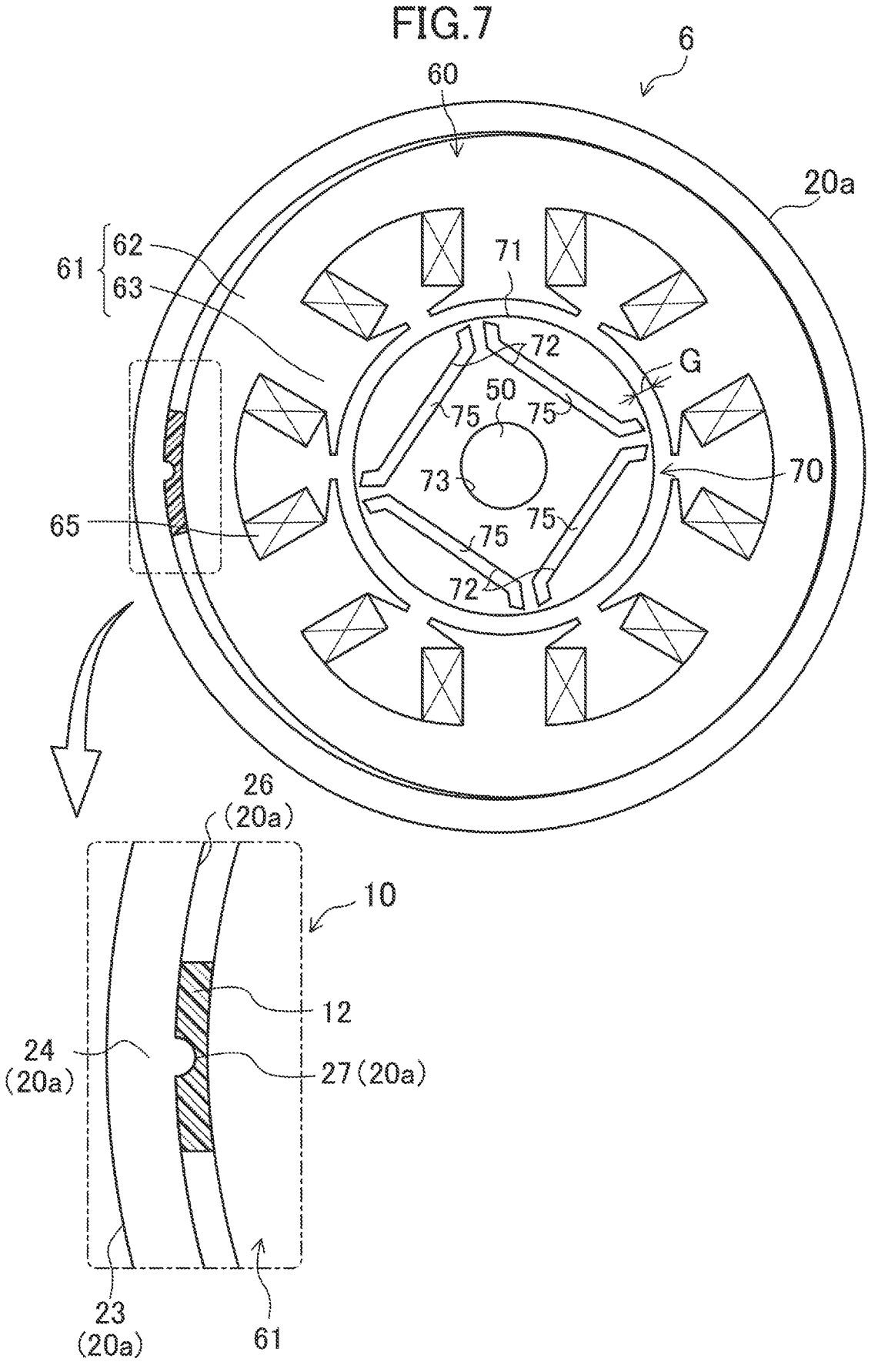
FIG. 7 is a longitudinal sectional view of a compressor including a rotary machine unit of a first variation.
Figure 8:
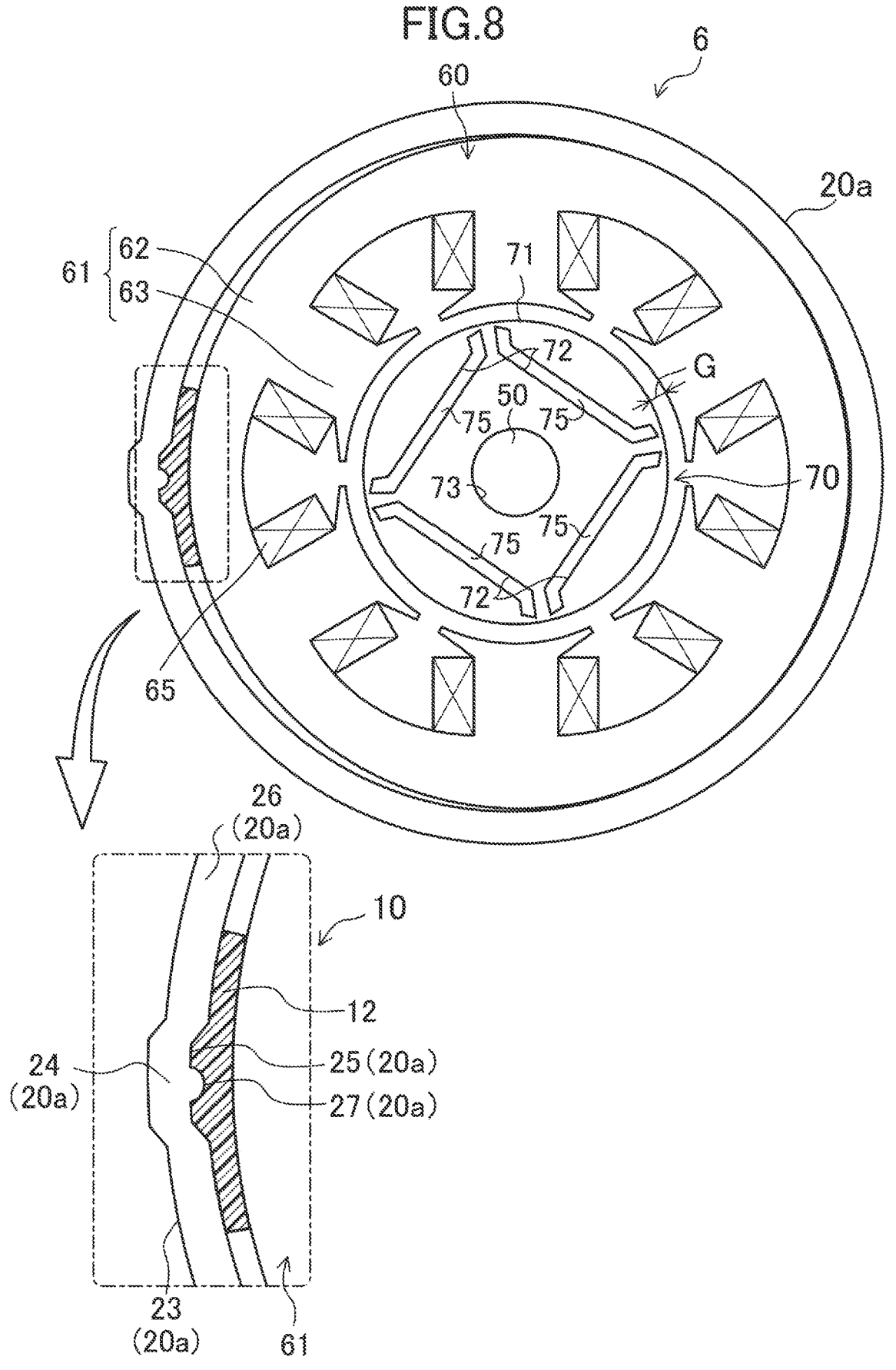
FIG. 8 is a longitudinal sectional view of a compressor including a rotary machine unit of another embodiment.

Embodiments will be described below with reference to the drawings. The following embodiments are merely exemplary ones in nature, and are not intended to limit the scope, application, or use of the present invention. In FIGS. 4, 7, and 8, hatching is partially omitted.

Embodiment

Air Conditioner

Figure 1:
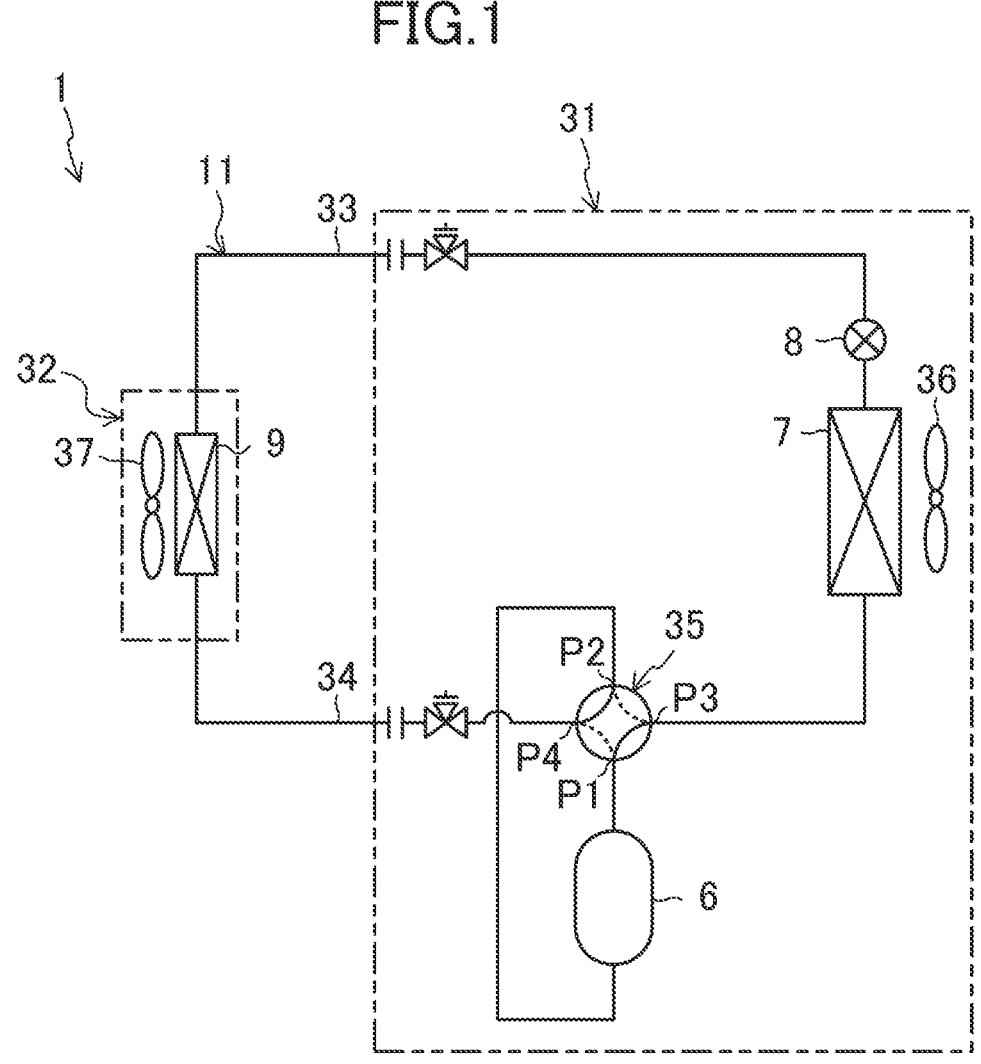
FIG. 1 is a schematic diagram showing the configuration of a refrigerant circuit included in a refrigeration apparatus of an embodiment.
Figure 2:
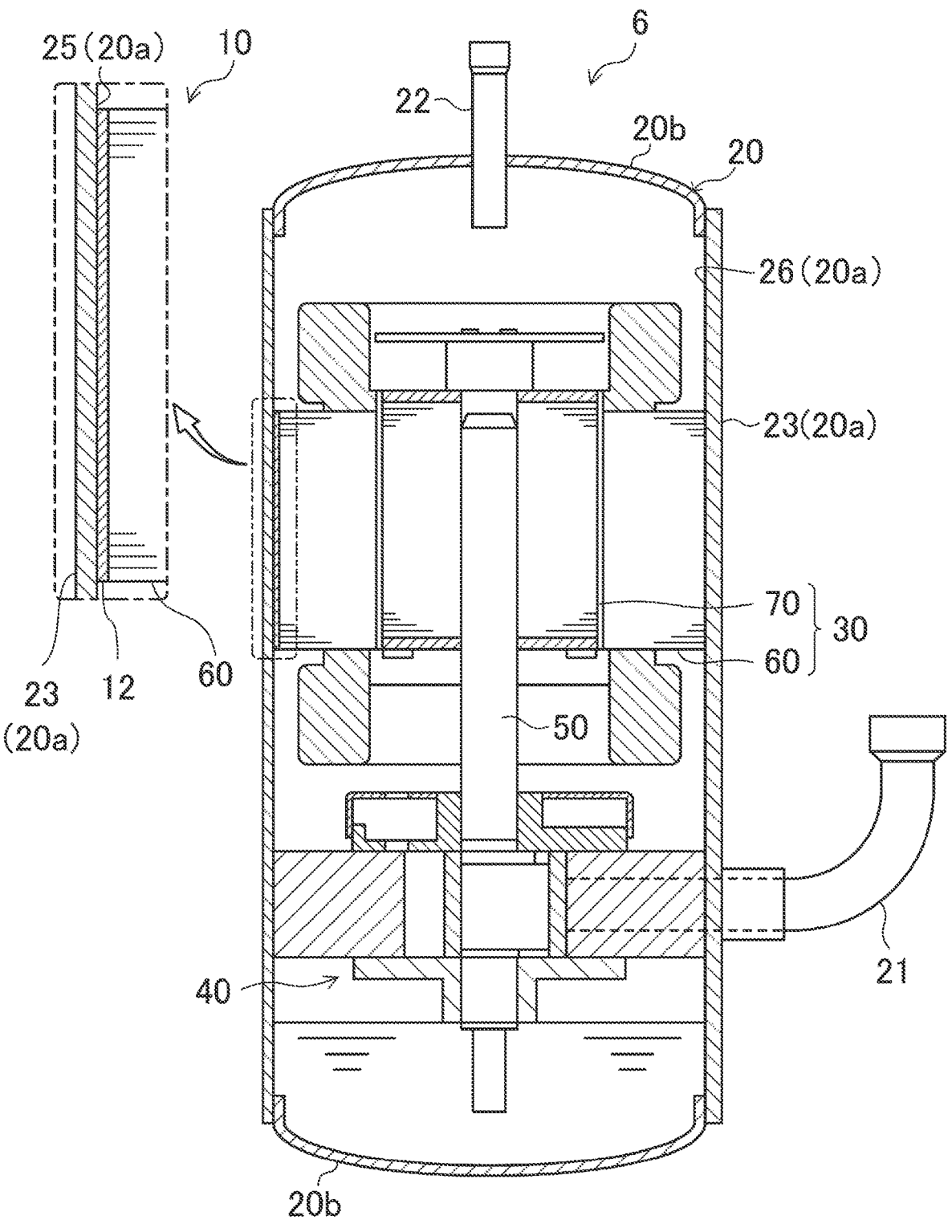
FIG. 2 is a longitudinal sectional view of a compressor having a rotary machine unit of the embodiment.

As illustrated in FIGS. 1 and 2, a rotary machine unit (10) of the embodiment forms a compressor (6) that compresses fluid. The compressor (6) is provided in an air conditioner (1) as illustrated in FIG. 1, for example. The air conditioner (1) is a refrigeration apparatus (1) of the present disclosure.

The air conditioner (1) includes one outdoor unit (31) and one indoor unit (32). The outdoor unit (31) and the indoor unit (32) are connected to each other through a liquid communication pipe (33) and a gas communication pipe (34). These components are connected to form a refrigerant circuit (11). The refrigerant circuit (11) is filled with refrigerant. The refrigerant circuit (11) includes, as main components, the compressor (6), an outdoor heat exchanger (7), an expansion valve (8), an indoor heat exchanger (9), and a four-way switching valve (35). The air conditioner (1) performs a refrigeration cycle by circulating refrigerant between the outdoor unit (31) and the indoor unit (32), thereby conditioning air in an indoor space. The air conditioner (1) performs cooling operation or heating operation.

Outdoor Unit

The outdoor unit (31) is placed outside. The outdoor unit (31) has the compressor (6), the outdoor heat exchanger (7), the expansion valve (8), the four-way switching valve (35), and an outdoor fan (36).

The compressor (6) sucks and compresses low-pressure gas refrigerant. The compressor (6) discharges the compressed refrigerant. Details of the compressor (6) will be described later.

The outdoor heat exchanger (7) exchanges heat between outdoor air transported by the outdoor fan (36) and refrigerant. The outdoor fan (36) transports outdoor air passing through the outdoor heat exchanger (7).

The expansion valve (8) decompresses refrigerant. The expansion valve (8) is an electric expansion valve having a variable opening degree. The expansion valve (8) only has to be connected to the liquid communication pipe (33) of the refrigerant circuit (11), and may be provided in the indoor unit (32).

The four-way switching valve (35) has a first port (P1), a second port (P2), a third port (P3), and a fourth port (P4). The first port (P1) is connected to a discharging portion of the compressor (6). The second port (P2) is connected to a suction portion of the compressor (6). The third port (P3) is connected to a gas end portion of the outdoor heat exchanger (7). The fourth port (P4) is connected to the gas communication pipe (34).

The four-way switching valve (35) switches between a first state (state indicated by a solid line in FIG. 1) and a second state (state indicated by a broken line in FIG. 1). In the first state, the first port (P1) and the third port (P3) communicate with each other, and the second port (P2) and the fourth port (P4) communicate with each other. In the second state, the first port (P1) and the fourth port (P4) communicate with each other, and the second port (P2) and the third port (P3) communicate with each other. By switching the four-way switching valve (35) between the first state and the second state, the air conditioner (1) can switchably operate between the cooling operation and the heating operation.

Indoor Unit

The indoor unit (32) is placed inside. The indoor unit (32) includes an indoor fan (37) and the indoor heat exchanger (9).

The indoor heat exchanger (9) is a utilization-side heat exchanger of the present disclosure. The indoor fan (37) transports indoor air passing through the indoor heat exchanger (9). The indoor heat exchanger (9) exchanges heat between indoor air transported by the indoor fan (37) and refrigerant.

Configuration of Compressor

The compressor (6) has the rotary machine unit (10). As will be described in detail later, the rotary machine unit (10) includes a casing (20), a stator core (61), and a resin layer (12). In addition, the compressor (6) includes a compression mechanism (40), a motor (30), and a shaft (50). The shaft (50) couples the motor (30) and the compression mechanism (40) to each other. The motor (30) includes a stator (60). The stator (60) includes the stator core (61).

Compression Mechanism

The compression mechanism (40) compresses fluid. In this example, the compression mechanism (40) compresses refrigerant sucked through a suction pipe (21) provided in the casing (20), and discharges the compressed refrigerant into an internal space of the casing (20). The refrigerant discharged into the internal space of the casing (20) is discharged through a discharge pipe (22) provided in the casing (20).

Motor

The motor (30) rotationally drives the shaft (50). The compression mechanism (40) is driven by rotary drive of the shaft (50).

Configuration of Motor

As illustrated in FIGS. 2 and 4, the motor (30) includes the stator (60) and a rotor (70).

In the following description, an "axial direction" refers to the direction of the axis of the stator (60) (center of rotation of the rotor (70)). A "radial direction" refers to a direction perpendicular to the direction of the axis of the stator (60). A "circumferential direction" refers to a direction about the axis of the stator (60). A "longitudinal section" is a section along the axial direction, and a "transverse section" is a section perpendicular to the axial direction.

The stator (60) is fixed to the inner peripheral surface of the casing (20). The rotor (70) is disposed radially inside the stator (60) with a gap (G) therebetween. In this example, the motor (30) is an interior permanent magnet synchronous motor.

Stator

The stator (60) has the stator core (61) and coils (65).

Although will be described in detail later, the stator core (61) has a back yoke (62) and teeth (63).

The coil (65) is wound around the tooth (63). In this example, the coil (65) is wound around the tooth (63) by concentrated winding.

Rotor

The rotor (70) has a rotor core (71) and permanent magnets (75). In this example, four permanent magnets (75) are provided.

The rotor core (71) is provided with slots (72) and a shaft hole (73). In this example, four slots (72) corresponding to the four permanent magnets are provided. The rotor core (71) is a laminated core. Specifically, the rotor core (71) is formed by stacking, in the axial direction, a plurality of substantially-circular electromagnetic steel sheets.

The slot (72) accommodates the permanent magnet (75). In this example, the four slots (72) are disposed at equal pitches (specifically, 90° pitches) in the circumferential direction.

The shaft hole (73) penetrates a center portion of the rotor core (71) in the axial direction. The shaft (50) is inserted into and fixed to the shaft hole (73).

The permanent magnet (75) forms the magnetic pole of the rotor (70). In this example, the four permanent magnets (75) are accommodated in the four slots (72) such that four magnetic poles are formed. The permanent magnet (75) is a sintered magnet.

Configuration of Rotary Machine Unit

The casing (20), the stator core (61), and the resin layer (12) forming the rotary machine unit (10) will be described.

Casing

The casing (20) accommodates the components of the rotary machine unit (10). The casing (20) has a tubular barrel (20a) extending in the up-down direction and two lids (20b) closing both ends of the barrel. A material forming the casing (20) is metal. Specifically, the material forming the casing (20) includes iron.

The barrel (20a) has a barrel body (23), a large-diameter portion (26), and a groove (25). The barrel body (23) is formed in a cylindrical shape. The large-diameter portion (26) is formed by expanding the inner diameter of the inner peripheral surface of the barrel (20a). The large-diameter portion (26) is substantially the entire inner peripheral surface of the barrel (20a). The groove (25) is a concave portion (25) of the present disclosure. Specifically, the groove (25) is a cut groove (25). As will be described in detail later, the cut groove (25) is formed in the inner peripheral surface of the barrel (20a). The cut groove (25) extends in the up-down direction of the barrel (20a).

In a section perpendicular to the cylinder axis direction of the barrel (20a), the shape of the inner peripheral surface of the barrel (20a) is a non-perfect circular shape as viewed from the cylinder axis direction of the barrel (20a). In this example, in the cylinder axis direction of the barrel (20a), the shape is substantially the same in any arbitrary section perpendicular to the cylinder axis direction of the barrel (20a). Specifically, the deviation of the inner peripheral surface of the barrel (20a) from the perfect circle is 0.6% or more. The "deviation from the perfect circle" G is obtained by G (%)=Roundness dmin (μm) of Inner Peripheral Surface of Barrel (20a)/Outer Diameter rmin (μm) of Barrel (20a)/2×100.

Figure 3:
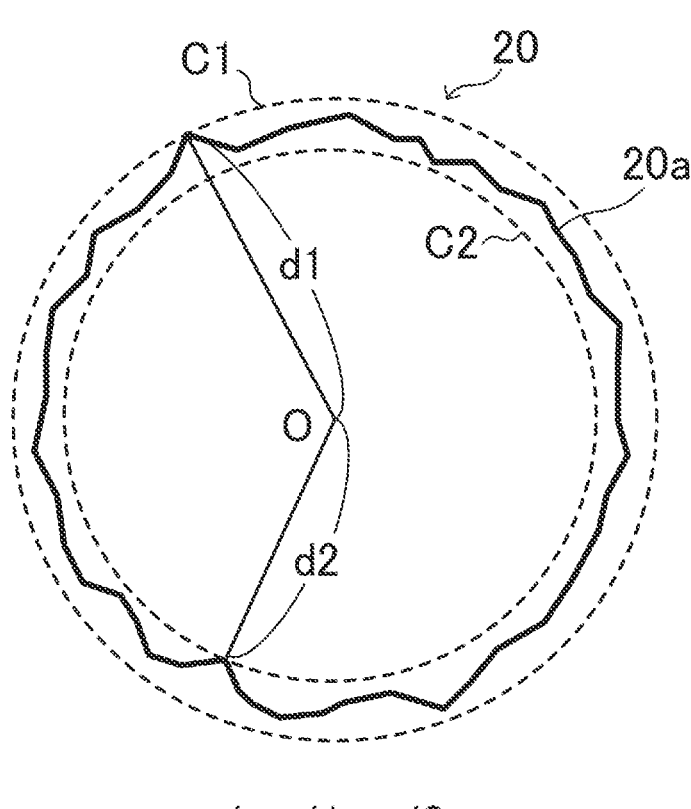
FIG. 3 is a sectional view of a barrel in a section perpendicular to a cylinder axis direction for describing deviation from a perfect circle.

As illustrated in FIG. 3, the roundness of the inner peripheral surface of the barrel (20a) is represented by a difference d between the radius d1 of a circle C1 and the radius d2 of a circle C2 in a case where a distance between these two concentric circles is the minimum when the section perpendicular to the cylinder axis direction of the barrel (20a) is interposed between the two circles C1, C2 with the cylinder axis as the center O, dmin is a value at which the radius difference d is the smallest in an arbitrary section perpendicular to the cylinder axis direction of the barrel, and rmin is the outer diameter of the barrel (20a) in a section in which the radius difference d is dmin.

As illustrated in FIG. 2, the casing (20) accommodates the motor (30), the compression mechanism (40), and the shaft (50). The shaft (50) extends in the up-down direction. The motor (30) is disposed above the compression mechanism (40).

The casing (20) is provided with the suction pipe (21) and the discharge pipe (22). A suction pipe (21) penetrates the barrel of the casing (20), and is connected to the compression mechanism (40). The discharge pipe (22) penetrates an upper portion of the casing (20) to communicate with the internal space of the casing (20).

Stator Core

The stator core (61) has the back yoke (62) and the teeth (63). In this example, six teeth (63) are provided. The stator core (61) is a laminated core. Specifically, the stator core (61) is formed by stacking, in the axial direction, a plurality of substantially-circular electromagnetic steel sheets. A material forming the stator core (61) is metal. Specifically, the material forming the stator core (61) includes iron.

The back yoke (62) is formed in a substantially cylindrical shape.

The tooth (63) extends radially inward from the inner peripheral surface of the back yoke (62). In this example, the six teeth (63) are disposed at equal pitches (specifically, 60° pitches) in the circumferential direction.

Resin Layer

The resin layer (12) is a first member (12) of the present disclosure. The resin layer (12) has a lower Young's modulus than those of the material forming the casing (20) and the material forming the stator core (61). The Young's modulus of the resin layer (12) is $\frac{1}{10}$ or less of those of the material forming the casing (20) and that of the material forming the stator core (61). Specifically, the resin layer (12) is made of a resin material. The resin material includes thermoplastic resin. The thermoplastic resin includes, for example, polyphenylene sulfide (PPS), polybutylene terephthalate (PBT), polyamide (PA) nylon, and liquid crystal polymer (LCP).

The resin layer (12) is provided between the inner peripheral surface of the barrel (20a) and the outer peripheral surface of the stator core (61). Specifically, the resin layer (12) is provided between the cut groove (25) of the barrel (20a) and the outer peripheral surface of the stator core (61).

As described above, the rotary machine unit (10) of this example is provided in part of a clearance between the inner peripheral surface of the barrel (20a) and the outer peripheral surface of the stator core (61) through the resin layer (12). The rotary machine unit (10) of this example has a portion in which the inner peripheral surface of the barrel (20a) and the stator core (61) are fixed to each other through the resin layer (12), and a portion in which the inner peripheral surface of the barrel (20a) and the stator core (61) are fixed in direct contact with each other.

Manufacturing of Rotary Machine Unit

Next, a method for manufacturing the rotary machine unit (10) will be described. The rotary machine unit (10) is manufactured by fixing the stator in the barrel (20a) by shrink fit after the barrel (20a) has been formed.

As illustrated in FIGS. 5A to 5D, the barrel (20a) is formed by sequentially forming the barrel body (23), a welded portion (24), the large-diameter portion (26), and the cut groove (25).

Figure 5A:
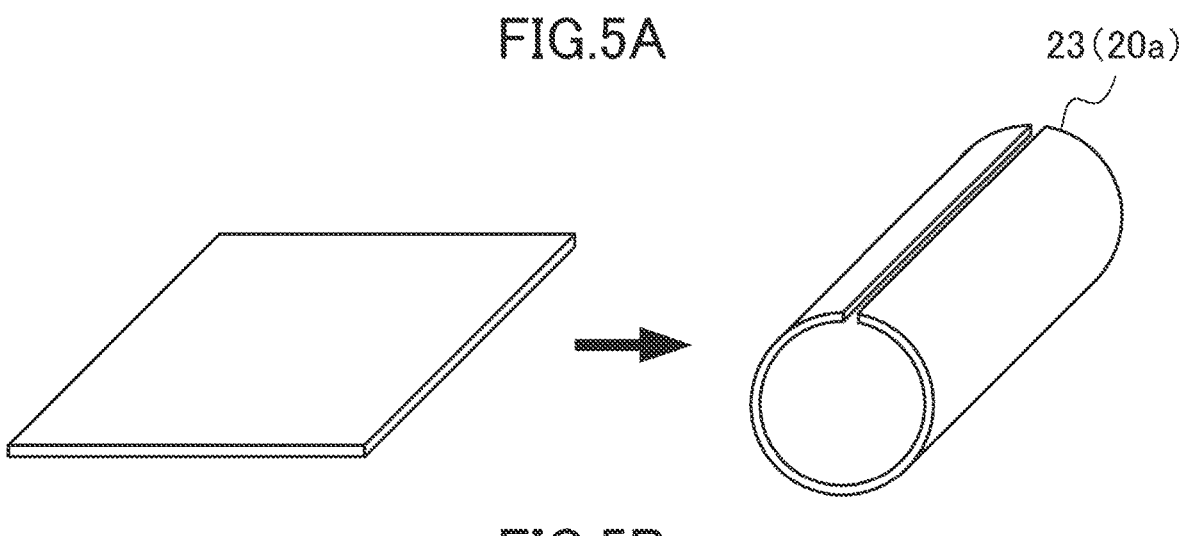
FIG. 5A is a perspective view for describing formation of a barrel body.

As illustrated in FIG. 5A, the barrel body (23) is formed by roll-forming into a cylindrical shape after a steel sheet has been cut out into a rectangular shape.

Figure 5B:
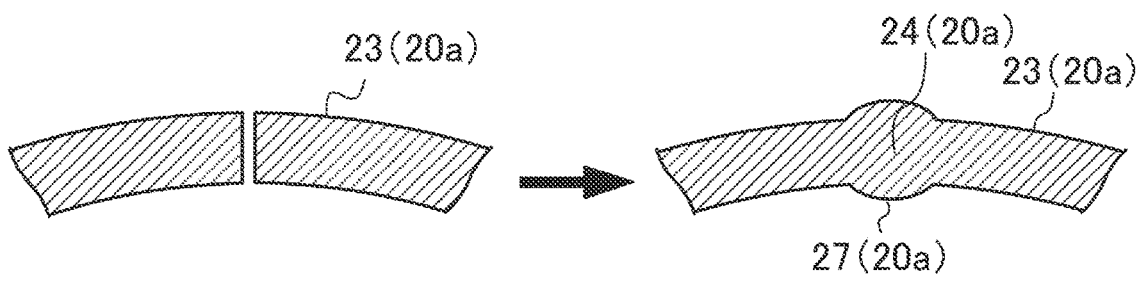
FIG. 5B is an enlarged view of part of the barrel body as viewed in the cylinder axis direction for describing formation of a welded portion.

As illustrated in FIG. 5B, the welded portion (24) is formed by connecting and welding both ends of the roll-formed barrel body (23) in the circumferential direction. After the metal melted on the inner and outer surfaces of the barrel at the welded portion (24) has been cooled and solidified, a weld bead (27) in which a joint (welded portion (24)) portion is raised in a convex shape is formed.

Figure 5C:
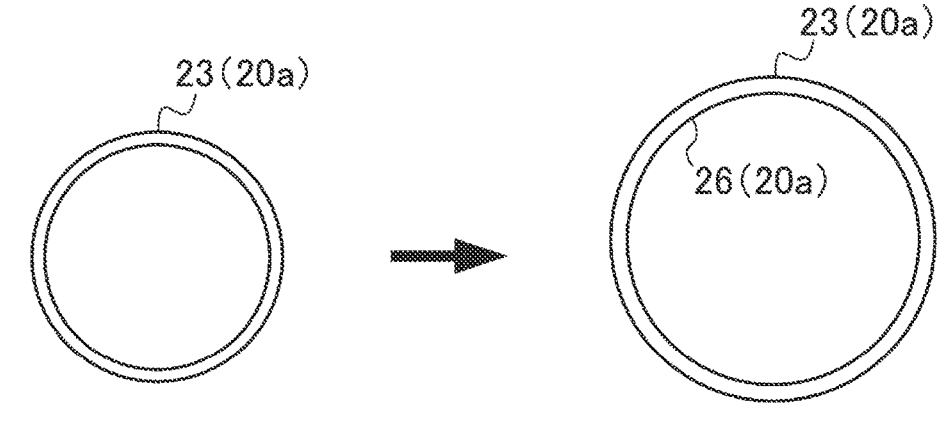
FIG. 5C is a view of the barrel body as viewed in the cylinder axis direction for describing formation of a large-diameter portion.

As illustrated in FIG. 5C, the large-diameter portion (26) is formed by uniformly expanding the entire inner peripheral surface of the barrel (20a) radially outward so as to increase the inner diameter of the barrel (20a).

Figure 5D:
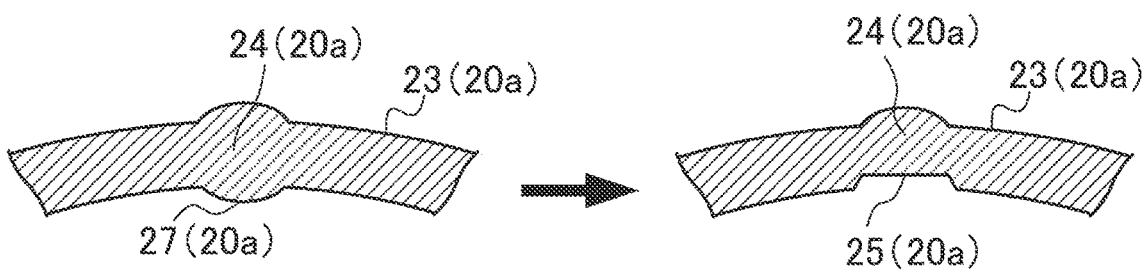
FIG. 5D is an enlarged view of part of the barrel body for describing formation of a cut groove.

As illustrated in FIG. 5D, the cut groove (25) is formed by cutting off part of the weld bead (27) formed on the inner peripheral surface of the barrel (20a).

Next, a method of fixing the stator core (61) in the barrel (20a) by shrink fit will be described.

Figure 6:
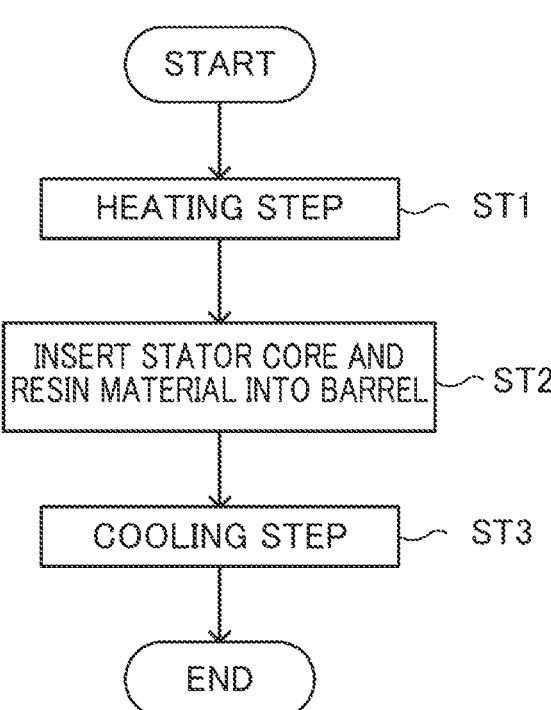
FIG. 6 is a flowchart of a method for fixing a stator to the barrel.

As illustrated in FIG. 6, a heating step of heating the barrel (20a) is performed (Step ST1). By heating, the barrel (20a) expands, and the inner diameter of the barrel (20a) expands accordingly. Next, the stator core (61) and the resin material are inserted into the barrel (20a) (Step ST2). At this time, the resin material is disposed such that the resin layer (12) is provided between the cut groove (25) formed in the inner peripheral surface of the barrel (20a) and the outer peripheral surface of the stator core (61).

Thereafter, a cooling step of cooling the barrel (20a) is performed (Step ST3). By the cooling step, the barrel (20a) shrinks, and the inner diameter of the barrel (20a) shrinks accordingly. The contracted barrel (20a) and the resin material come into contact with each other, and the resin material is melted and deformed by residual heat of the barrel (20a). By further cooling, the resin material is cooled and solidified, and fills the cut groove (25) and is deformed by compressive stress from the stator core (61) and the barrel (20a). Accordingly, the resin material comes into close contact with the outer peripheral surface of the stator core (61) and the inner peripheral surface of the barrel (20a). In this manner, the resin layer (12) is formed between the cut groove (25) and the outer peripheral surface of the stator core (61).

Advantages of Embodiment

In the rotary machine unit (10) of the embodiment, the resin layer (12) (first member) is provided between the inner peripheral surface of the barrel (20a) of the casing (20) formed in the non-perfect circular shape as viewed in the cylinder axis direction and the outer peripheral surface of the stator core (61). Since the resin layer (12) has a lower Young's modulus than those of the material forming the casing (20) and the material forming the stator core (61), the resin layer (12) is relatively easily deformed between the inner peripheral surface of the barrel (20a) and the outer peripheral surface of the stator core (61). Thus, by providing the resin layer (12) in the clearance between the inner peripheral surface of the barrel (20a) and the outer peripheral surface of the stator core (61), the area of contact between the outer peripheral surface of the stator core (61) and the inner peripheral surface of the barrel (20a) can be increased through the resin layer (12). As a result, even if the inner peripheral surface of the barrel (20a) of the casing (20) is formed in the non-perfect circular shape as viewed in the cylinder axis direction, holding force of holding the stator core (61) in the barrel (20a) can be increased, and therefore, the efficiency of the motor for reducing stress on the stator core (61) can be improved.

In addition, the resin layer (12) provided between the stator core (61) and the barrel (20a) can increase the holding force on the stator core (61) in the circumferential direction. Thus, even when the rotor (70) rotates, displacement of the stator core (61) in the circumferential direction in the barrel (20a) can be reduced.

In the rotary machine unit (10) of the embodiment, the barrel (20a) has the concave portion (25) formed in the inner peripheral surface of the barrel (20a), and the resin layer (12) is provided between the concave portion (25) and the outer peripheral surface of the stator core (61). By providing the resin layer (12) so as to close the concave portion (25), the outer peripheral surface of the stator core (61) and the inner peripheral surface of the barrel (20a) can be fixed to each other through the resin layer (12) at the location where the concave portion (25) is formed. In addition, since the resin layer (12) is formed so as to fill the concave portion (25), it is possible to reduce displacement of the resin layer (12) in the barrel (20a) due to rotation of the motor (30).

In the rotary machine unit (10) of the embodiment, the barrel (20a) has the barrel body (23) and the welded portion (24) connecting both ends of the barrel body (23) in the circumferential direction, and the concave portion (25) is the groove (25) formed in the welded portion (24). Thus, the resin layer (12) can be provided in the groove (25) formed in the welded portion (24).

In the rotary machine unit (10) of the embodiment, the groove (25) is the cut groove (25) formed in the inner peripheral surface of the barrel (20a). In general, in a case where the stator core (61) and the barrel (20a) are fixed to each other by interference fit, the outer peripheral surface of the stator core (61) is prevented from contacting the welded portion (24) as much as possible. This is because the manufacturing tolerance of the welded portion (24) tends to be greater than that of the barrel (20a) other than the welded portion (24). For this reason, if the stator core (61) and the barrel (20a) are fixed to each other by interference fit in a state in which the outer peripheral surface of the stator core (61) contacts the welded portion (24) of the barrel (20a), the magnitude of stress generated by interference fit varies according to individuals (rotary machine units), or stress is concentrated on specific portions of the stator core (61) and the barrel (20a). As a result, an individual difference in the quality of the rotary machine unit may increase, breakage such as cracking of the barrel (24a) and the stator core (61) may occur, or the stator core (61) may be dropped.

On the other hand, in the rotary machine unit (10) of this example, the outer peripheral surface of the stator core (61) and the inner peripheral surface of the barrel (20a) can be fixed to each other through the resin layer (12). By providing the resin layer (12) in the cut groove (25), the outer peripheral surface of the stator core (61) and the inner peripheral surface of the barrel (20a) can be fixed to each other through the resin layer (12) at the location where the cut groove (25) is formed. This is because formation of the resin layer (12) can reduce variation in stress on the stator core (61) and the barrel (20a) even if the manufacturing tolerance is increased. In addition, the resin layer (12) can cancel the individual difference in the stress due to the interference fit.

In the rotary machine unit (10) of the embodiment, the barrel (20a) includes the large-diameter portion (26) formed by expanding the inner diameter of the inner peripheral surface of the barrel (20a). Even in the case of the barrel (20a) having such a large-diameter portion (26), the holding force of holding the stator core (61) in the barrel (20a) can be increased by providing the resin layer (12) between the outer peripheral surface of the stator core (61) and the inner peripheral surface of the barrel (20a).

In the rotary machine unit (10) of the embodiment, the resin layer (12) contains the resin material. Since the resin material has a lower Young's modulus than those of the casing (20) and the stator core (61), the resin layer (12) can be formed relatively easily.

In the rotary machine unit (10) of the embodiment, the resin layer (12) contains the thermoplastic resin material, and the stator core (61) is fixed to the inner peripheral surface of the barrel (20a) through the resin layer (12) by shrink fit. The thermoplastic resin material is melted and deformed by the heating step for the barrel (20a) by shrink fit. In the subsequent cooling step for the barrel (20a), the thermoplastic resin is solidified and closely contacts the inner peripheral surface of the barrel (20a) and the outer peripheral surface of the casing (20). By forming such a resin layer (12), the holding force of holding the stator core (61) in the barrel (20a) can be increased.

In the rotary machine unit (10) of the embodiment, the resin layer (12) is made of the material having a Young's modulus of $\frac{1}{10}$ or less of those of the material forming the casing (20) and the material forming the stator core (61). Such a material is relatively easily deformed between the inner peripheral surface of the barrel (20a) and the outer peripheral surface of the stator core (61), and the resin layer (12) is relatively easily formed from this material.

First Variation

In the rotary machine unit (10) of this example, the position of the resin layer (12) between the stator core (61) and the barrel (20a) is different from that in the above-described embodiment. Hereinafter, the rotary machine unit (10) of this variation will be described with reference to FIG. 7.

The barrel (20a) of this variation has a weld bead (27) formed on the inner peripheral surface of the barrel (20a). The weld bead (27) is a convex portion (27) of the present disclosure. The weld bead (27) is a weld mark formed on the surface of the barrel body (23) and the surface of the welded portion (24) connecting both ends of the barrel body (23) in the circumferential direction.

In the step of forming the barrel (20a) in this variation, the weld bead (27) formed on the inner peripheral surface of the barrel (20a) is not cut. In other words, the barrel (20a) of this variation does not have the cut groove (25).

By providing the resin layer (12) between the weld bead (27) on the inner peripheral surface of the barrel (20a) and the outer peripheral surface of the stator core (61), the area of contact between the outer peripheral surface of the stator core (61) and the inner peripheral surface of the barrel (20a) can be increased through the resin layer (12). Thus, even if the inner peripheral surface of the barrel (20a) is formed in the non-perfect circular shape as viewed in the cylinder axis direction, the holding force of holding the stator core (61) in the barrel (20a) can also be increased in this variation.

In addition, as described above, when the stator core (61) and the barrel (20a) are fixed to each other by interference fit, the weld bead (27) which is generally the joint is prevented from contacting the outer peripheral surface of the stator core (61). However, by providing the resin layer (12)

between the weld bead (27) and the outer peripheral surface of the stator core (61), the outer peripheral surface of the stator core (61) and the inner peripheral surface of the barrel (20a) can be fixed to each other through the resin layer (12) at the location where the weld bead (27) is formed on the inner peripheral surface of the barrel (20a). This is because the resin layer (12) can reduce the stress on the cut groove (25).

In addition, even when the motor (30) rotates, the resin layer (12) is caught by the weld bead (27), and therefore, displacement of the resin layer (12) in the barrel (20a) can be reduced.

Other Embodiments

The above-described embodiment and variation may be modified in the following manner.

In the embodiment, in the rotary machine unit (10), the material forming the casing (20) and the material forming the stator core (61) may include an aluminum material.

The first member (12) may be made of a material having a Young's modulus of ½ or less of those of the material forming the casing (20) and the material forming the stator core (61). For example, the material forming the casing (20) and the material forming the stator core (61) may contain an iron material, and the material forming the first member (12) may contain an aluminum material.

The rotary machine unit (10) may have the casing (20), the deviation of the inner peripheral surface of the barrel (20a) of which from the perfect circle is 0.3% or more.

The rotary machine unit (10) may have the casing (20), the deviation of the inner peripheral surface of the barrel (20a) of which from the perfect circle is 1.0% or more.

The resin layer (12) may be provided between the inner peripheral surface of the barrel (20a) other than the concave portion (25) formed in or the convex portion (27) formed on the inner peripheral surface of the barrel (20a) and the outer peripheral surface of the stator core (61).

The resin layer (12) may be provided over the entire circumferences of the inner peripheral surface of the barrel (20a) and the outer peripheral surface of the stator core (61).

The resin layer (12) may be provided from the upper end to the lower end of the stator core (61), or may be provided partially from the upper end to the lower end of the stator core (61).

Figures 9A, 9B:
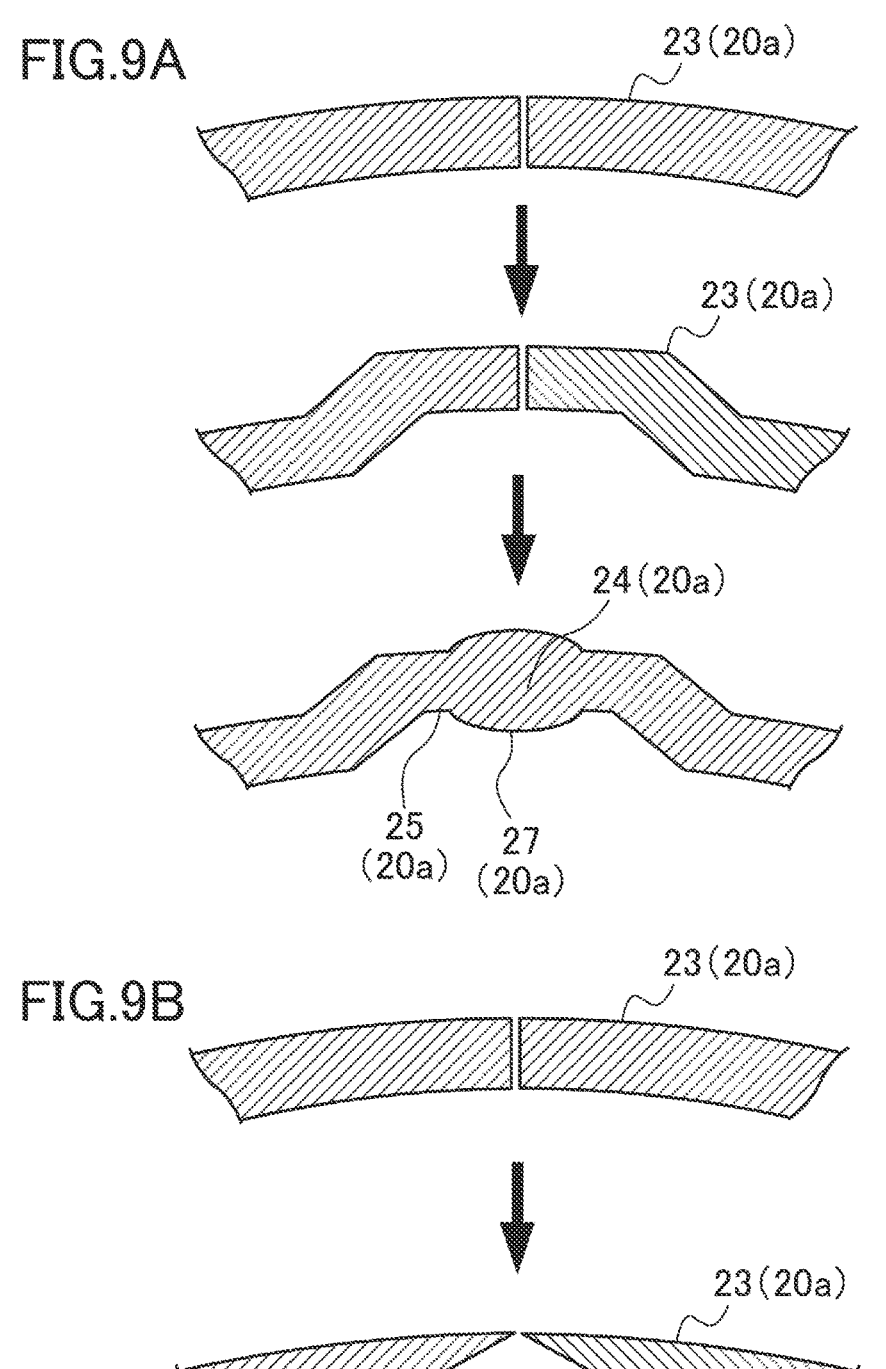
FIG. 9A is an enlarged view of part of a barrel body as viewed in the cylinder axis direction for describing formation of a barrel of the rotary machine unit of FIG. 8.
FIG. 9B is an enlarged view of part of the barrel body as viewed in the cylinder axis direction for describing formation of the barrel of the rotary machine unit of FIG. 8.

As illustrated in FIG. 8, the barrel (20a) may have the groove (25) formed in the inner peripheral surface of the barrel (20a) in the cylinder axis direction and the weld bead (27) formed in the groove (25). As a method of forming such a barrel (20a), both ends of the barrel body (23) in the circumferential direction are first formed so as to protrude outward in the radial direction, and then, are welded to form the groove (25), as illustrated in, e.g., FIG. 9A. At this time, the weld bead (27) is formed in the groove (25) by welding. Alternatively, as illustrated in FIG. 9B, after both ends of the barrel body (23) in the circumferential direction have been cut out, the groove (25) is formed in the inner peripheral surface of the barrel (20a) upon welding. At this time, the weld bead (27) is formed in the groove (25) by welding.

The shape of the arbitrary section perpendicular to the cylinder axis direction of the barrel (20a) may vary. Specifically, the convex portion (27) or the concave portion (25) may be formed partially from the upper end to the lower end of the barrel (20a) in the cylinder axis direction.

Figure 10:
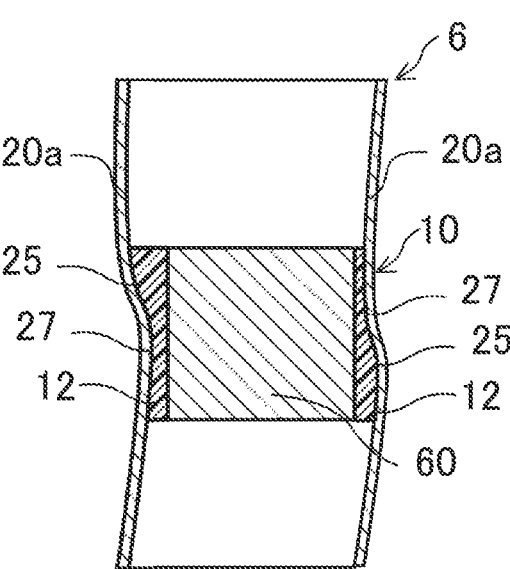
FIG. 10 is a schematic view illustrating the longitudinal section of a compressor having a rotary machine unit of another embodiment.

In addition, as illustrated in FIG. 10, the convex portion (27) or the concave portion (25) may be formed in the circumferential direction of the barrel (20a). Also in this case, the resin layer (12) is provided between the convex portion (27) on the inner peripheral surface of the barrel (20a) or the concave portion (25) in the inner peripheral surface of the barrel (20a) and the outer peripheral surface of the stator core (61). The resin layer (12) provided between the outer peripheral surface of the stator core (61) and the inner peripheral surface of the barrel (20a) may be provided over the entire circumference of the outer peripheral surface of the stator core (61), or may be provided partially. Part of the resin layer (12) may be provided so as to protrude from the upper end or the lower end of the stator core (61).

The concave portion (25) or the convex portion (27) may be formed in or on the outer peripheral surface of the stator core (61). In this case, the resin layer (12) is provided between the concave portion (25) in the outer peripheral surface of the stator core (61) or the convex portion (27) on the outer peripheral surface of the stator core (61) and the inner peripheral surface of the barrel (20a).

The resin layer (12) may contain plural types of resin materials having different properties. The resin layer (12) may contain glass fibers or fillers.

The resin layer (12) may be formed by shrink-fitting the stator core (61) and the barrel (20a) after the resin material has been provided in the cut groove (25).

The stator core (61) may be fixed in the barrel (20a) by press fit or cold fit.

The first member (12) may be ceramic. The ceramic includes alumina, glass, zirconia, etc.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure. The expressions of "first," "second," . . . described above are used to distinguish the terms to which these expressions are given, and do not limit the number and order of the terms.

As described above, the present disclosure is useful for a rotary machine unit, a compressor, and a refrigeration apparatus.

The invention claimed is:

1. A rotary machine unit comprising:
   a casing having a tubular barrel;
   a stator core fixed to an inner peripheral surface of the tubular barrel; and
   a first member provided between the inner peripheral surface of the tubular barrel and an outer peripheral surface of the stator core,
   the tubular barrel including a barrel body and a welded portion that connects circumferentially opposing ends of the barrel body,
   the tubular barrel having a concave portion formed in the inner peripheral surface of the tubular barrel, the concave portion being a groove formed in the welded portion,
   the first member being provided between the concave portion and the outer peripheral surface of the stator core, and
   the first member being made of a material having a lower Young's modulus than a material forming the tubular barrel and a material forming the stator core.

2. The rotary unit of claim 1, wherein the groove is a cut groove formed in the welded portion on the inner peripheral surface of the tubular barrel.

3. A rotary machine unit comprising:

a casing having a tubular barrel;

a stator core fixed to an inner peripheral surface of the tubular barrel; and a first member provided between the inner peripheral surface of the tubular barrel and an outer peripheral surface of the stator core, the tubular barrel including a barrel body and a welded portion that connects circumferentially opposing ends of the barrel body, the tubular barrel has a convex portion formed on the welded portion at the inner peripheral surface of the tubular barrel, and the first member is provided between the convex portion and the outer peripheral surface of the stator core, the first member being made of a material having a lower Young's modulus than a material forming the tubular barrel and a material forming the stator core.

4. The rotary machine unit of claim 3, wherein the convex portion is a weld bead formed at the welded portion.

5. The rotary machine unit of claim 1, wherein the tubular barrel includes a large-diameter portion formed by expanding an inner diameter of the inner peripheral surface of the tubular barrel.

6. The rotary machine unit of claim 1, wherein the first member contains a resin material.

7. The rotary machine unit of claim 6, wherein the first member contains a thermoplastic resin material, and the stator core is fixed to the inner peripheral surface of the tubular barrel with the first member by shrink fit.

8. The rotary machine unit of claim 1, wherein the first member is made of a material having a Young's modulus of ½ or less of the material forming the tubular barrel and the material forming the stator core.

9. The rotary machine unit of claim 1, wherein the first member is made of a material having a Young's modulus of ¹⁄₁₀ or less of the material forming the tubular barrel and the material forming the stator core.

10. The rotary machine unit of claim 1, wherein the material forming the tubular barrel and the material forming the stator core contain an iron material, and the first member contains an aluminum material.

11. The rotary machine unit of claim 1, wherein the material forming the tubular barrel and the material forming the stator core are metal, and the first member contains resin.

12. The rotary machine unit of claim 1, wherein a deviation of the inner peripheral surface of the tubular barrel from a perfect circle is 0.3% or more.

13. The rotary machine unit of claim 1, wherein a deviation of the inner peripheral surface of the tubular barrel from a perfect circle is 0.6% or more.

14. The rotary machine unit of claim 1, wherein a deviation of the inner peripheral surface of the tubular barrel from a perfect circle is 1.0% or more.

15. A compressor including the rotary machine unit of claim 1.

16. A refrigeration apparatus including the compressor of claim 15.

* * * * *